United States Patent [19]

Rogers et al.

[11] Patent Number: 5,269,728
[45] Date of Patent: Dec. 14, 1993

[54] DIFFERENTIAL DRIVE

[75] Inventors: William E. Rogers, Troy; Floyd J. Hill, Loudonville, both of N.Y.

[73] Assignee: Power Kinetics, Inc., Troy, N.Y.

[21] Appl. No.: 833,940

[22] Filed: Feb. 11, 1992

[51] Int. Cl.⁵ .............................. F16H 7/24; F16H 7/20
[52] U.S. Cl. ....................................... 474/150; 254/388; 474/165; 474/205; 126/607
[58] Field of Search ............................... 474/148–150, 474/160, 162, 164, 165, 205; 198/311; 414/7; 254/388; 126/606, 607, 577

[56] References Cited

U.S. PATENT DOCUMENTS

| 20,868 | 7/1858 | Dinsmoor | 254/388 X |
|---|---|---|---|
| 304,952 | 9/1884 | Paul | 254/388 X |
| 476,986 | 6/1892 | Edison | 474/149 X |
| 509,391 | 11/1893 | Paine | 126/603 |
| 592,099 | 10/1897 | Schwalm | 254/388 |
| 695,397 | 3/1902 | Johnson | 254/388 |
| 847,907 | 3/1907 | Colavecchio | 254/388 |
| 3,466,119 | 9/1969 | Francia | 126/605 X |
| 3,987,452 | 10/1976 | Godet | 343/765 |
| 4,145,021 | 3/1979 | Gaechter et al. | 126/605 X |
| 4,147,414 | 4/1979 | Raser | 126/573 X |
| 4,236,448 | 12/1980 | Wieland | 474/150 X |
| 4,283,183 | 8/1981 | Janzen et al. | 474/162 |
| 4,312,326 | 1/1982 | Johnson | 126/573 X |
| 4,671,783 | 6/1987 | Seymour | 474/148 |
| 5,046,375 | 9/1991 | Salisbury et al. | 414/7 X |

Primary Examiner—Ramon S. Britts
Assistant Examiner—Roger J. Schoeppel
Attorney, Agent, or Firm—Joseph V. Claeys

[57] ABSTRACT

A differential hoist and drive includes a differential escapement mechanism arranged mechanically between and in combination with a pair of direction turning members, such as pulleys. An endless loop of a flexible force transmitting element (cable, chain, strap, or the like) interconnects the direction turning members and the differential escapement. The load can be connected to either the differential escapement or the direction turning members with the other being anchored as a fixed member. The load is restrained from swinging or from other unintended movement. A turnbuckle or other suitable device provides for a desired pretensioning of the loop of flexible force transmitting element.

25 Claims, 13 Drawing Sheets

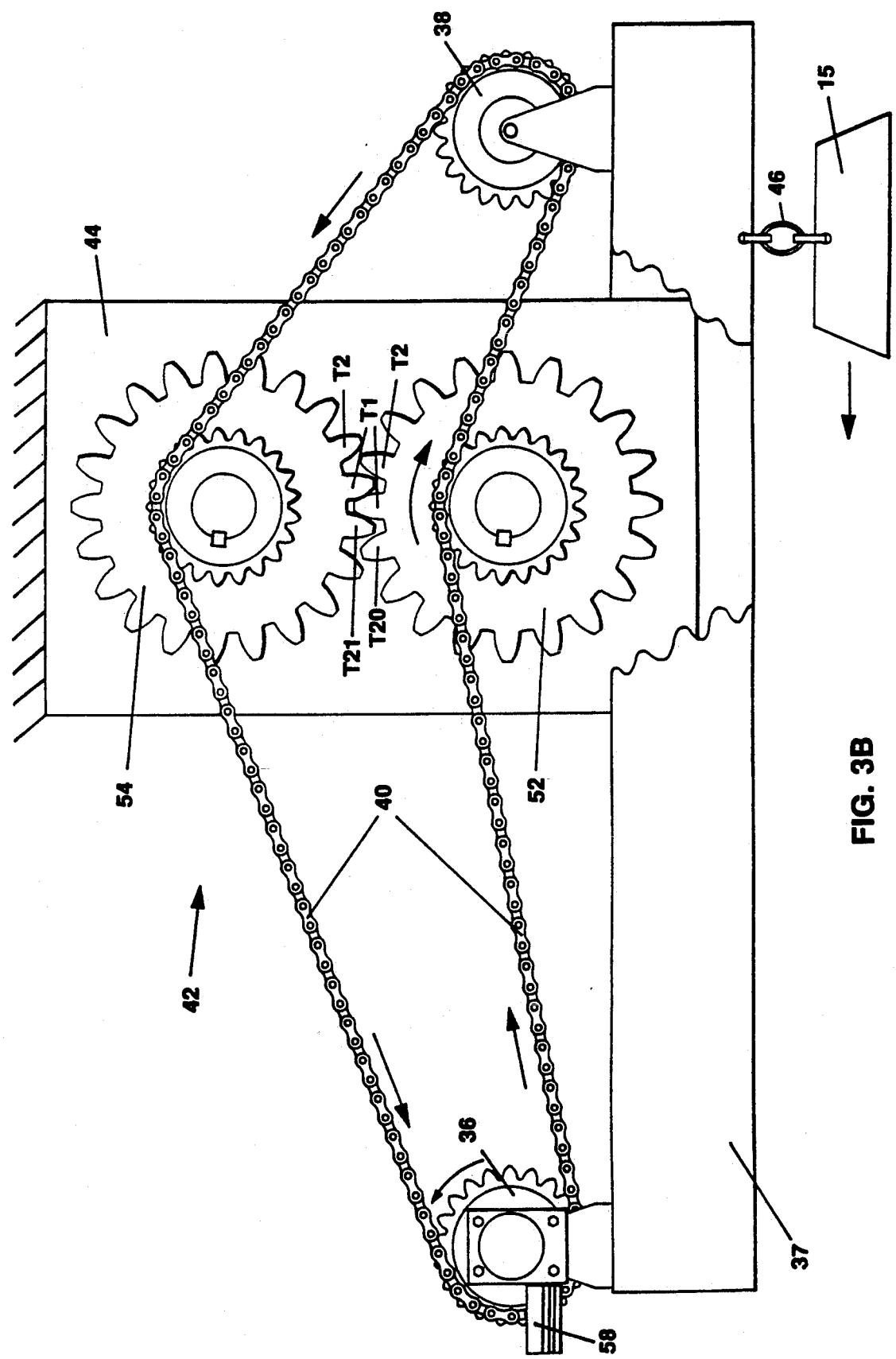

DIFFERENTIAL DRIVE

FIELD OF THE INVENTION

This invention relates to differential hoists and more particularly to a differential hoist and drive system which is capable of producing a large output force and large speed reduction ratio and which employs a flexible force transmitting element such as a cable, chain, strap, or the like, usually in the form of an endless loop, and which drive system achieves precision movement with a long operating life outdoors while requiring minimal maintenance.

BACKGROUND OF THE INVENTION

Differential hoists employing two drums of different diameters to increase the lifting power are well known in the prior art. Such prior art differential hoists, however, either allow loads to swing or under variable loads do not hold position which attributes are undesirable, and for many applications are wholly unacceptable. The present invention overcomes the foregoing difficulties and allows the driven structure to be rigidly and accurately fixed while accommodating widely variable loads. The present invention also employs a differential escapement which may include a differential pulley or drum having two regions of different diameters. In the present invention, however, the differential escapement means is disposed in combination with a pair of direction turning members, all drivingly interconnected by a flexible force transmitting element, such as a chain, flexible cable, strap or the like arranged in an endless loop to provide a new and improved differential drive or hoist where, through pretensioning, the position of a variable load can be rigidly fixed and restrained from swinging or other unintended movement.

While the invention may be employed as a hoist to lift various types of heavy loads, or to otherwise linearly move or rotatably drive various types of structures, it is especially advantageous for use in driving large outdoor structures such as radiotelescopes, parabolic dishes, and solar radiation collector systems which in order to properly follow satellites and other celestial bodies must be accurately pointed and moved with precision even under the most severe outdoor weather and wind conditions. Accordingly, the invention will also be particularly described in connection with driving such outdoor tracking structures.

For example, this invention is particularly advantageous in providing the driving means for large tracking structures and systems employing a curved rim or arcuate member such as the solar radiation collector systems described and claimed in the Assignee's concurrently filed U.S. patent application Ser. No. 07/834,165, filed Feb. 11, 1992, entitled "Lightweight Distributed Force, Two-axis Tracking, Solar Radiation Collector Structures", the description of which patent application is incorporated herein by reference. Such large tracking structures and systems must be rotatably supported from the ground for precise rotation with respect to the ground and in a secure manner and be capable of withstanding gale force buffeting winds and the other effects of the outdoor environment. The differential drive of this invention can not only readily provide the desired low cost, precision, large reduction ratio drive for such structures, but also securely hold these structures to their ground supports without requiring additional components.

Large outdoor structures such as radiotelescopes, parabolic dish antennas, and solar collectors which follow satellites and other celestial bodies must be accurately pointed and moved with precision. Even when large tracking structures are balanced (i.e. the center of gravity is on the axis of rotation), the drives for such structures must accommodate large unbalanced intermittent forces such as wind loads and the weight of ice or snow. Although none of the following referenced drive arrangements utilize such a differential drive, nor is any other drive known to be in any way related to the present invention, a brief discussion of prior art drive arrangements is believed to be helpful in showing the many attempts which have been made to provide drives for large tracking structures such as solar radiation collector systems and the like, and why the differential drive of this invention may be so advantageously employed for such applications.

FIG. 6 of U.S. Pat. No. 4,145,021 employs a double pulley system to increase the mechanical advantage. The system is not a differential drive but rather is a block and tackle type arrangement including a cable which effects several passes between two spaced apart tackles. Because of the mechanical advantage achieved from the block and tackle arrangement, this linear device is capable of multiplying the torque of a drive motor by a factor of seven, as illustrated. Since there is limited contact for friction (only two 180 degree wraps of cable shown on the drive wheel) this drive would not be entirely satisfactory for use with large outdoor tracking structures since it would have a tendency to slip in rough wet weather. For this type of drive to move and hold many tons of force and since a large pulley is required for long cable life (the diameter of pulleys used should be 50 times the diameter of the cable), a very high torque slow speed gearmotor would be required. Further, since in the drive shown in U.S. Pat. No. 4,145,021 both ends of the cable are fastened, the cable wears in only one region which is not acceptable for drives which must have long operating life outdoors. The overall speed reduction ratio achievable is quite limited compared to that of the differential drive of the present invention. Moreover, to achieve high ratios, very long cable lengths would be required.

One way to reduce the forces and precision required in drives for large outdoor structures such as radiotelescopes, parabolic dish antennas, and solar collectors is to inlcude a large wheel or rim and operate on its diameter which provides large leverage, such as shown in U.S. Pat. Nos. 4,209,231; 4,870,949, and German Patent No. DE 3418-879-A. This approach becomes expensive when precision components such as gears are utilized as machine elements at this scale (e.g. diameters between 10 and 50 meters).

Direct acting positive engagement flexible machine elements such as roller chain arrangements (e.g. U.S. Pat. No. 787,145), toothed belts or perforated bands (e.g. U.S. Pat. No. 3,987,452), cable with buttons or linked chain (U.S. Pat. Nos. 514,669 and 4,209,231) are less expensive to incorporate than a rigid gear/pinion arrangement but the torque of the drive motor and gear reduction must still be substantial in order to insure reliable operation under worst case conditions. Minimizing the backlash of final reduction gears requires the use of premium components, the addition of a dragging brake, an actuated brake, a separate locking mechanism, or other device for preventing lost motion. Lost motion limits accurate tracking and leads to component damage during extended periods when certain segments of the drive components must continually withstand the force of buffeting winds. Another limiting criterion is the requirement to operate for 30 to 50 years in an outdoor environment with ice, dirt and corrosive action of pollution. In some of these prior art systems provision for lubrication must be provided. The cost of mechanical elements of such systems makes drives with redundant parallel components expensive.

Low cost drives usually utilize friction elements, such as direct contact friction wheels (e.g. U.S. Pat. No. 4,470,050), cable or wire rope (e.g. U.S. Pat. Nos. 509,391; 508,393; 670,916; 4,145,021; 4,147,414; 4,491,388, and 4,870,949), or arrangements employing a metal or composite band/belt instead of accurately machined elements. Since these approaches are direct acting and rely on friction, they can allow inordinate slip in buffeting winds especially when lubricated by rain. To provide adequate friction in the case of cable, either multiple turns around a large diameter pinion or many wraps around smaller wheels have been required (e.g. U.S. Pat. No. 4,333,446, FIG. 2B). The reliance on friction can be eliminated by using two separate cables, one end fastened to the moving structure and drive drum respectively and wrapped in opposite directions (U.S. Pat. Nos. 3,466,119 and 4,312,326).

Because all of the above prior art approaches except for that of U.S. Pat. No. 4,145,021 are direct acting with the same surface speed in the final drive element and the mating element of the tracking structure, a high torque, slow speed gearmotor is required. A separate brake, clamp or latch to lock the tracking structure is also usually required in order to insure survival in gale force winds.

A number of prior art patents (U.S. Pat. Nos. 4,282,529; 4,392,140 and 4,396,919) use the term differential drive to describe the differential action of two drive motors to effect the aiming of the structure in two directions. Such type drives can use an endless loop of cable or chain. These patents, however, differ significantly from the present invention since they utilize the torque of the motors directly without mechanical advantage and since they do not employ a differential member disposed mechanically between a pair of direction turning pulleys, they operate on a different principle.

Accordingly, none of the prior art differential hoists or drive systems of which we are aware employ the unique combination and arrangement of elements as in the present invention to provide a differential hoist and drive system wherein the load is restrained against unintended movement. Moreover, none of the prior art drives of which we are aware have been entirely satisfactory for providing a low cost, reliable drive for large tracking structures and providing for long operating life in an outdoor environment with ice, dirt and the corrosive action of pollution in rain.

SUMMARY OF THE INVENTION

It is an object of this invention to provide a simple, flexible and inexpensive drive system to move, accurately point, and hold a body or structure under variable loads.

It is another object of the invention to provide a simple, flexible and inexpensive drive system which fails safely in a loss of power situation thereby obviating the need for additional components to prevent damage to the structure in such an event and under severe wind conditions.

It is another object of this invention to provide a reliable, long life, low cost drive system offering particular advantages for driving large outdoor tracking structures, such as solar radiation collectors, and which overcomes many of the prior art problems associated with driving and holding such structures.

Briefly stated, in accordance with one aspect of this invention there is provided a new and improved differential drive system for moving and holding a load, or driving and holding a body or structure. The differential drive system includes three primary elements:

(1) an endless loop of a flexible force transmitting element (such as a chain, a cable, a strap, or the like), (2) first and second direction turning members, arranged for receiving the flexible force transmitting element in driving engagement therewith, and (3) a differential escapement means positioned, mechanically between the direction turning members.

The flexible force transmitting element is arranged and constructed to drivingly interconnect the elements (2) and (3) so that force applied to the flexible force transmitting element produces relative movement between such elements. Pretensioning the flexible force transmitting element, which can be accomplished by any means which mechanically lengthens the circuit of the flexible force transmitting element, increases the positional accuracy of the moving element for loads which may vary in both magnitude and direction. Moving the direction turning members mechanically apart or changing the position of an idler member are two ways for pretensioning the flexible force transmitting element.

BRIEF DESCRIPTION OF THE DRAWINGS

The foregoing and other objects, features and many of the attendant advantages of the present invention will become apparent and better understood upon a reading of the following detailed description considered in conjunction with the accompanying drawings, in which like reference characters may designate the same or similar parts throughout the figures thereof and wherein:

FIG. 3B is a side view of an embodiment of the invention similar to that of FIG. 3, but wherein the differential escapement means is arranged to be the fixed element and the direction turning members are arranged to be the movable element and with the load shown connected to such movable element.

DESCRIPTION OF THE PREFERRED EMBODIMENTS

Figure 1:
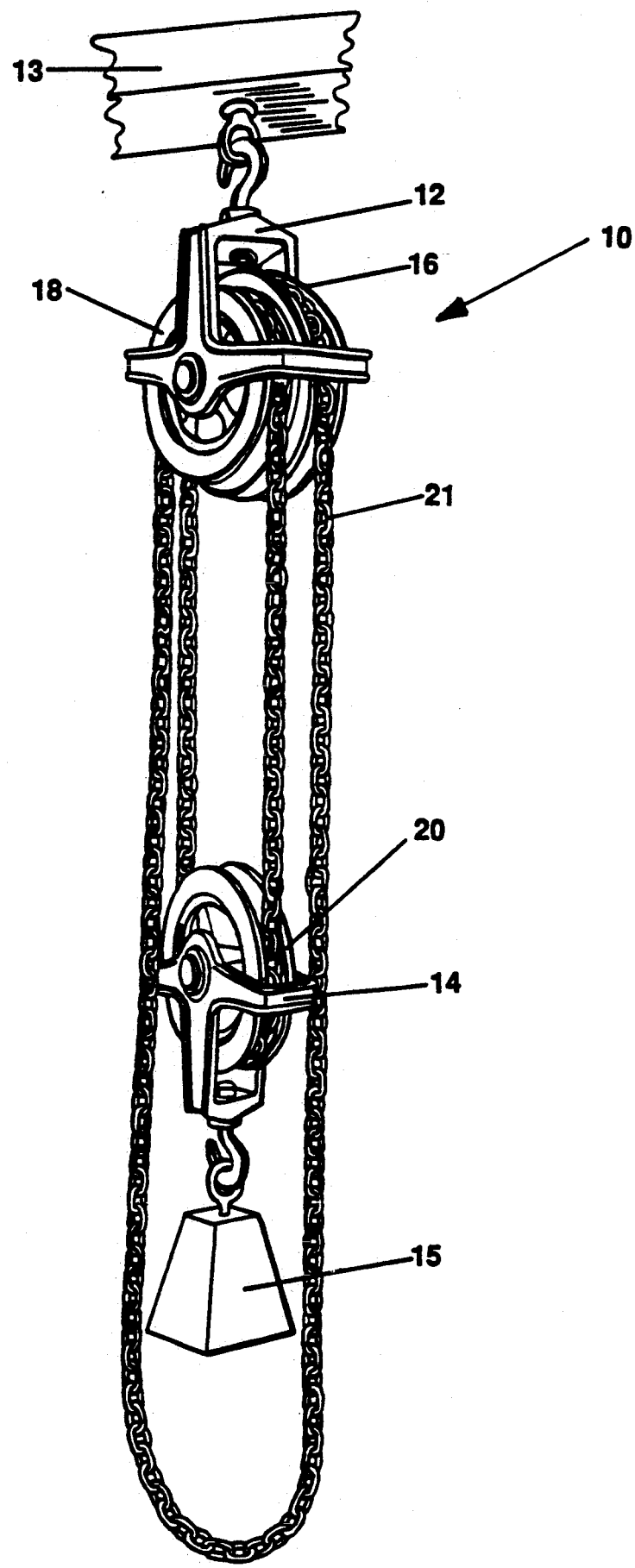
FIG. 1 is a perspective view of a well known type of prior art differential chain hoist.

Any suitable flexible force transmitting element such as chain, cable, strap, and the like may be employed in the present invention. A flexible cable, however, is preferred for use in many applications, especially outdoor applications requiring long operating life with a minimum of maintenance. For example, corrosion resistant cable is well proven in similar applications such as in cranes, carnival rides, elevators, mine hoists, chair lifts, and cable cars.

The present invention includes a differential escapement means and two direction turning members which are interconnected by a flexible force transmitting element in the form of an endless loop. A mechanism is usually included (typically by moving a direction turning member or idler to increase the mechanical length of the circuit) which enables a preloading force to pretension the flexible force transmitting element. Either the differential escapement means or the direction turning members can be anchored with the load connected to the other, which then has to move in relation to the anchored element(s). Pretensioning the system up to the rating of the flexible force transmitting element captures and restrains the load from unintended movement and results in extraordinarily rigid operation without degrading the rating of the components. Further, in the attractive high ratio reduction regimes, the present invention can obviate the need for a separate brake or other locking device in order to hold the load in a loss of power event. This feature can be included in the design by using a very high ratio differential escapement. Machine elements with teeth or the use of a worm gear, a high precision anti-backlash mechanism, or dragging brake are not required when using belting or cable as the flexible force transmitting element. Other important features which particularly distinguish this invention from the prior art are its flexibility to power very large structures and act over large distances without the need for large, precisely machined elements; automatic takeup of the flexible force transmitting machine element; and its ability to accommodate dirt and sand along with poor lubrication and corrosion in exposed harsh environments.

The differential escapement means includes a frame and means mounted in the frame for causing the unit length of flexible force transmitting element moving in one direction with respect to the frame to be different by a controlled amount from that moving in the opposite direction so that a force applied to the flexible force transmitting element produces a ratioed amount of relative motion between the direction turning members and the differential escapement means.

In one embodiment the differential escapement means includes a frame, a differential member, such as a differential pulley, having two regions of different diameters and being mounted for rotation within the frame, and means, such as one or more idler pulleys for maintaining the flexible force transmitting element in driving engagement with the differential member. Either the differential escapement means or the first and second direction turning members may be anchored whereby the other will be the moving member which would be adapted for connection to a load. That is, either (a) the first and second direction turning members can be fixed to a suitable fixed support, foundation, or other anchor, and the differential escapement means arranged as the moving member to be connected to the load, or (b) the differential escapement means can be fixed to a suitable support, foundation, or other anchor, and the first and second direction turning members arranged as the moving member to be connected to the load, to enable controlled relative motion between the differential escapement means and the direction turning members.

The flexible force transmitting element is arranged and constructed to form an endless loop which drivingly interconnects the first and second direction turning members and the differential escapement means whereby adequate force applied to the flexible force transmitting element causes it to translate through a cycle which produces a controlled amount of relative motion between the direction turning members and the differential escapement means. That is, such force applied to the flexible force transmitting element has a mechanical advantage equal to the ratio between the motion of the flexible force transmitting element and the motion between the direction turning members and the differential escapement means. In rotary devices, each rotation of the differential members requires that the length of the flexible member going in one direction be different than the length going in the opposite direction. For instance, for each revolution the difference between the effective circumference of the major diameter region and the circumference of the minor diameter region moves flexible force transmitting element from one side of the differential escapement means to the other. In devices with simple routing of the loop of flexible force transmitting element, which multiplies the mechanical advantage of the balance of the system by two, this movement is divided equally between the two sides of the loop of flexible force transmitting element. This displacement causes the differential escapement means to translate one half this difference. Additional pairs of pulleys can be added on both sides of the differential escapement means in balanced block and tackle arrangements to further multiply the mechanical advantage of the system. In these cases the movement of the differential escapement means is determined by dividing the displacement of flexible force transmitting element by the number of passes of said flexible force transmitting element which support the load on one side.

Force can be applied to the flexible force transmitting element in any suitable manner such a by hand, or by provision of a suitable motive means, such as a motor, for causing rotation of a selected one of the members which are drivingly interconnected by the flexible force transmitting element thereby applying a force to the flexible force transmitting element. Conveniently, a direction turning member or the differential escapement means may be driven by a suitable motor. Alternatively, the differential members of the differential escapement means may be additionally caused to move differentially by a second motive means.

Referring now to the drawings, FIG. 1 illustrates a differential chain hoist of the type well known in the prior art. The hoist 10 includes a fixed block 12 and a traveling block 14 dangling below and adapted for connection to a load 15. The fixed block 12 is usually connected to a structure as shown. Mounted for rotation within the fixed block 12 are two wheels 16 and 18 of different diameters which are connected together and rotate as a unit. Wheels 16 and 18 thus constitute a differential member having a major diameter wheel 16 and a minor diameter wheel 18 which are connected together. Rotation of the differential member (usually in the fixed block 12) in one direction lowers the hoist while rotation in the other direction raises the hoist. A free-wheeling direction turning member 20 located in the traveling block 14 guides and supports endless loop of chain 21 to insure good mechanical operation.

Although the foregoing differential hoist arrangement employing a differential member including two different diameter wheels 16 and 18 serves to increase the lifting power and is quite satisfactory for routine hoisting applications, the load 15 is unrestrained and, therefore, can swing and otherwise move about. Varying the load in this arrangement causes the chain to stretch different amounts so that the height of the traveling block 14 changes as a function of load. In many applications such movement of the load is undesirable or entirely unacceptable. This is especially so in applications such as a solar collector or antenna where it is not acceptable for the load to swing or otherwise be unrestrained since this would allow the wind to move the supported mass and affect tracking accuracy.

Figure 2:
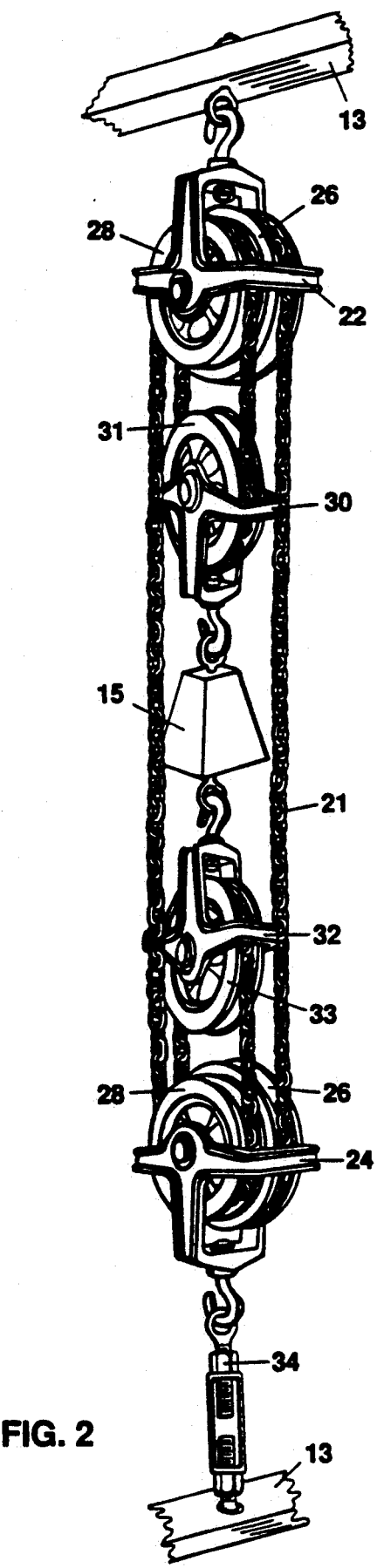
FIG. 2 is a perspective view of a differential chain hoist in accordance with one embodiment of the present invention.

FIG. 2 shows a differential hoist or drive in accordance with one embodiment of the present invention which overcomes the foregoing difficulty and restrains the load 15 between two fixed points 13. The arrangement shown in FIG. 2 employs chain as the flexible force transmitting element and includes two fixed blocks 22 and 24 disposed opposite each other and each is adapted to be secured to a suitable anchoring structure 13. Each of the fixed blocks 22 and 24 are shown as being differential members each including a major diameter wheel 26 and a minor diameter wheel 28. A block 30 including a direction turning pulley 31 rotatably mounted therein is disposed mechanically between the other fixed block 22 and the load 15. A block 32 including another direction turning pulley 33 rotatably mounted therein is similarly disposed mechanically between the fixed block 24 and the load 15. An endless loop of chain 21 drivingly interconnects the wheels of each of the blocks 22, 24, 30 and 32. Although in FIG. 2 the two wheels 26 and 28 in each of the fixed blocks 22 and 24 are shown as being of different diameters, such wheels disposed in the fixed block which is not driven (22 or 24 as the case may be) can be of the same diameter if they are allowed to float separately. Since an endless loop of chain is used, the two sides are coordinated because what is taken up on one side is automatically available to the other side. A tensioning means, shown as a turnbuckle 34, connected between the fixed block 24 and the anchoring structure 13 allows controlled pretension in the system to minimize lost motion.

Figure 3:
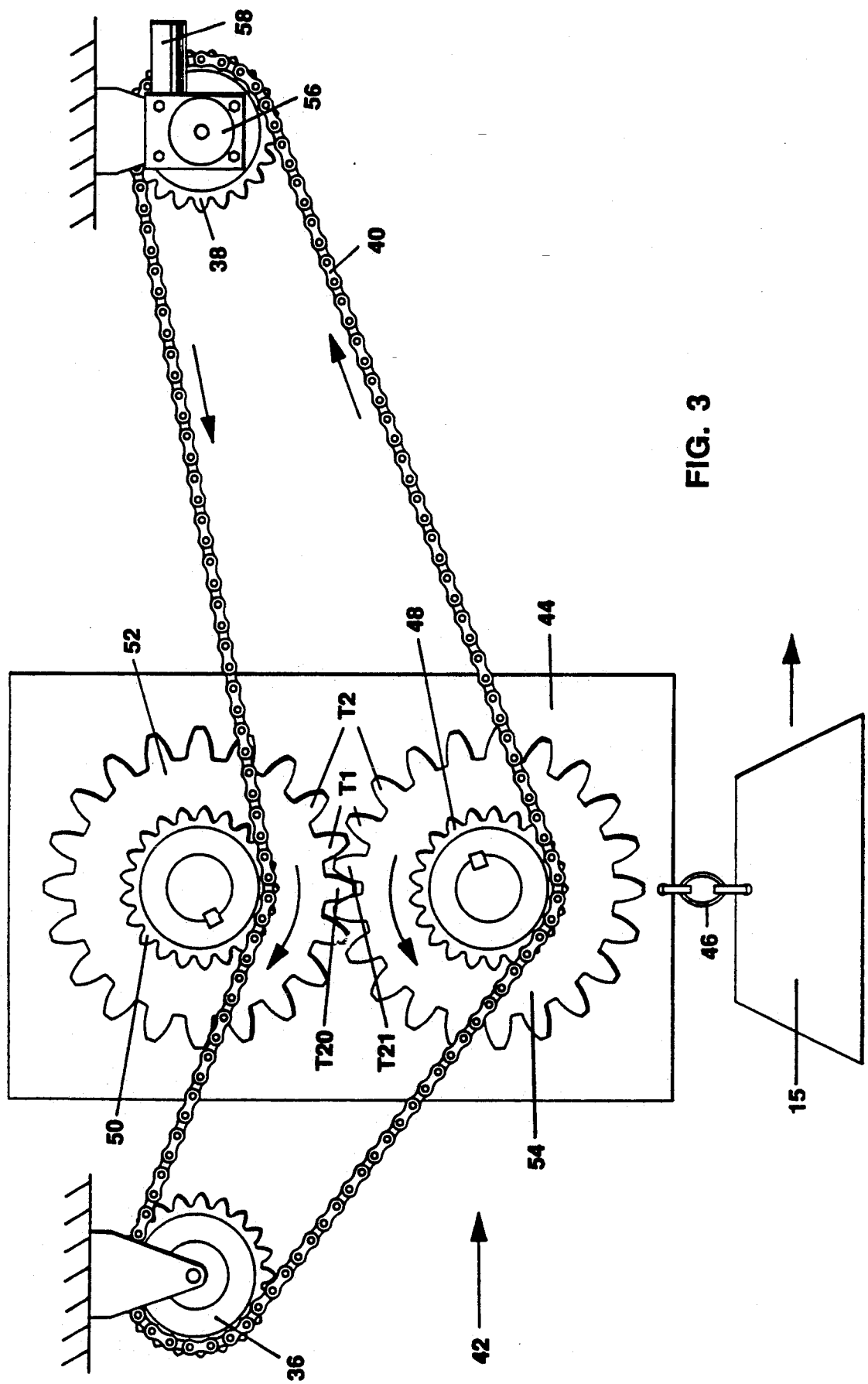
FIG. 3 is a side view of another embodiment of this invention which includes gears in the differential escapement means.

FIG. 3 is a side view of a differential drive in accordance with another embodiment of this invention and wherein the flexible force transmitting element is shown as an endless loop of roller chain. In the arrangement shown in FIG. 3 the direction turning members, shown as direction turning sprockets 36 and 38, are fixed to a suitable support or foundation and a differential escapement means 42 is suspended mechanically between the two direction turning sprockets 36 and 38. The differential escapement means 42 includes a suitable frame 44 which may be provided with a suitable means, such as a link 46, for connection to a load 15. It will be understood, that although in the arrangement illustrated in FIG. 3 the two direction turning sprockets 36 and 38 are shown as being anchored and the differential escapement means 42 is the movable element adapted for connection to the load, either the turning sprockets 36 and 38 or the differential escapement means 42 can be anchored to enable controlled relative motion of the other. That is, one of (a) the differential escapement means 42 and (b) the direction turning sprockets 36 and 38 are arranged and constructed to be the moving member for connection to a load and the other is arranged and constructed for connection with a support or anchor. Accordingly, as illustrated in FIG. 3B, when the differential escapement means 42 is anchored, the two direction turning sprockets 36 and 38, shown connected in spaced-apart relationship to member 32, would comprise the movable element of the drive and would be provided with a suitable means, such as the link 46 for connection to the load 15.

In the foregoing arrangement the endless loop of roller chain 40 is engaged by sprockets 48 and 50 in such a way that for each revolution of the sprocket 48, the other sprocket 50 rotates a different amount. In this example the sprocket 50 is attached to the spur gear 52 which has 20 teeth. The first second, and last teeth of spur gear 52 are identified as T1, T2, and T3 respectively. Sprocket 48 identical to sprocket 50 is attached to spur gear 54 which has 21 teeth. The first, second and last teeth of spur gear 54 are identified as T1, T2, and T21 respectively. Since spur gears 52 and 54 are engaged, each unit length of roller chain 40 passed by sprocket 48 is slightly less (@20/21) roller chain than the unit length passed in the other direction by sprocket 50. As illustrated, motor 56 through gearbox 58 turns direction turning sprocket 38 and the loop of roller chain 40 counterclockwise. The difference between the roller chain engaged with the differential members is added to the left hand side which causes the movable element (the differential escapement 42 in this illustration) to move to the right by one half the difference.

Figure 3A:
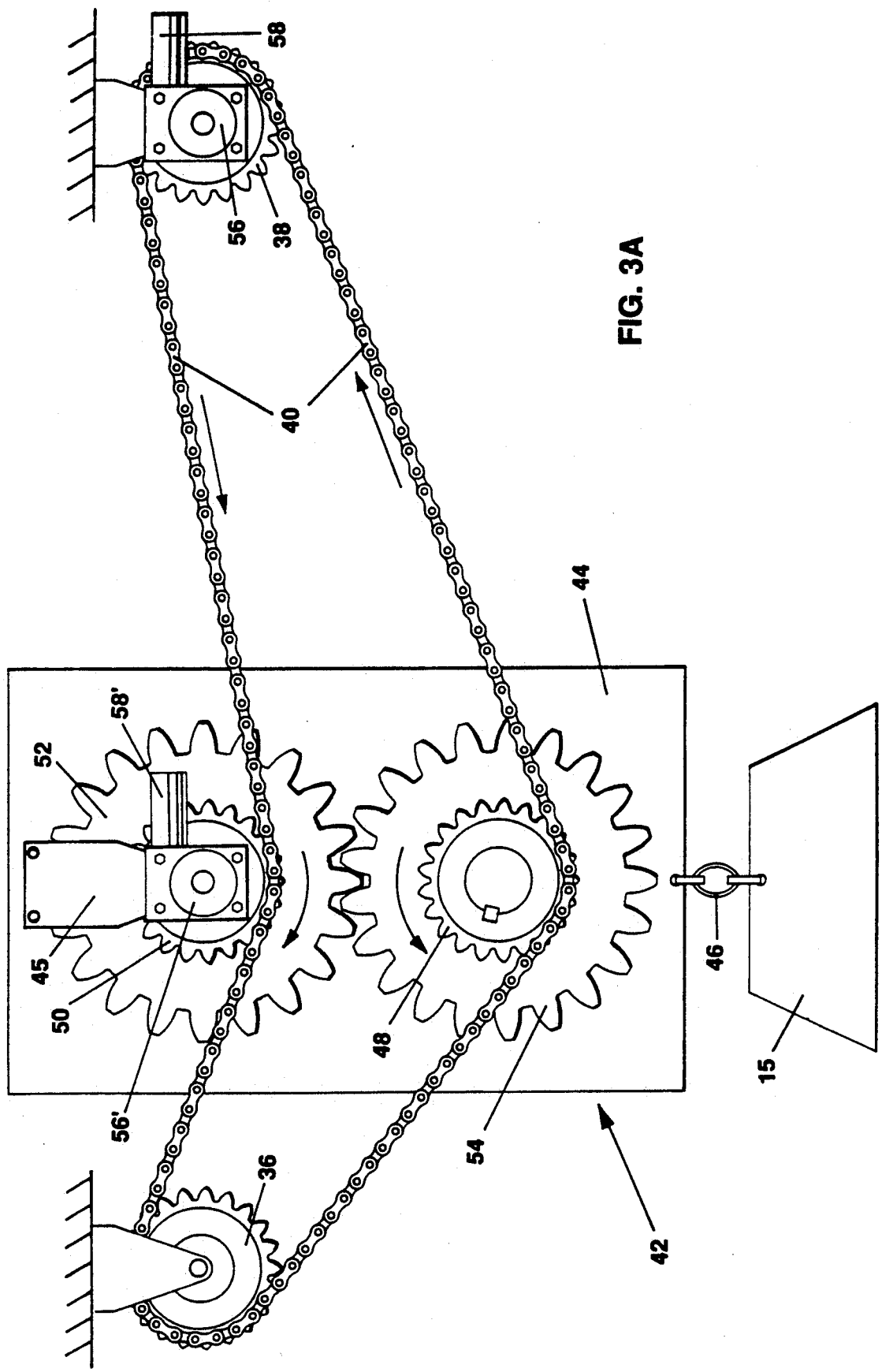
FIG. 3A is a similar side view of yet another embodiment of this invention wherein the differential escapement means utilizes separate motors.

In FIG. 3, the sprockets 48 and 50 are shown as both having the same number of teeth. The differential escapement can also use sprockets made to rotate together but with a different number of teeth. Differential escapements can be made in a large variety of other ways both mechanical and electrical. Any mechanism or arrangement of mechanisms which causes the loop of flexible force transmitting element moving in one direction to be different than that going in the other direction will result in relative motion between the direction turning members and the differential escapement means. FIG. 3A illustrates one approach which utilizes two prime movers: motor 56 through gearbox 58 moves the flexible force transmitting element and motor 56' through gearbox 58' can change the differential motion within the escapement means. Motor 56' is shown connected to the frame 44 by a suitable bracket 45.

Figure 4:
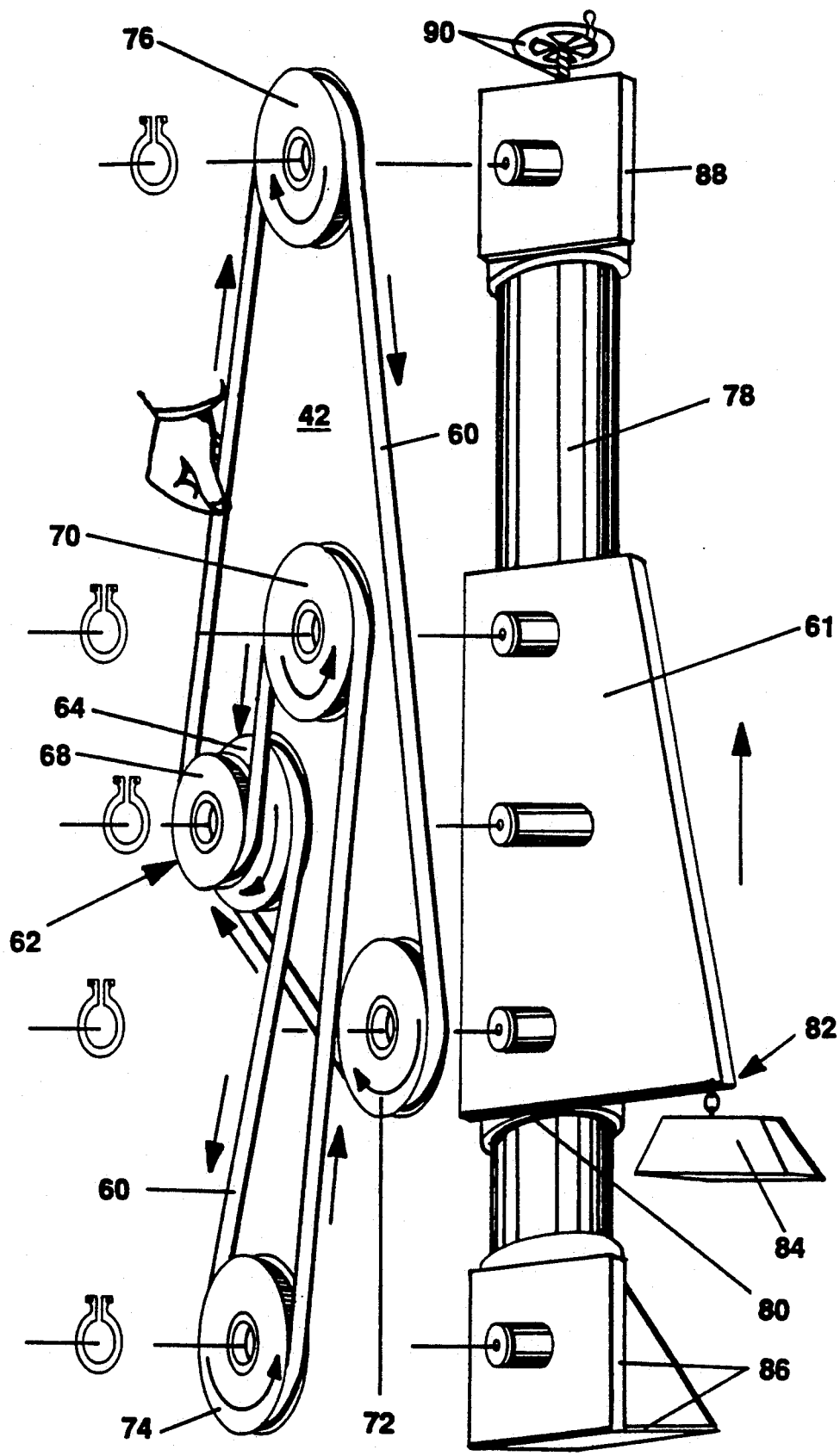
FIG. 4 is a diagrammatic exploded view of a differential flexible cable drive in accordance with this invention showing an arrangement for routing the flexible cable to drivingly interconnect the pulleys.

FIG. 4 is a diagrammatic exploded view of a differential drive in accordance with another embodiment of this invention and wherein the flexible force transmitting element is illustrated as being a flexible cable. The same principle used in the differential chain hoist arrangements of FIGS. 2 and 3 can, of course, be used with flexible cable as the flexible force transmitting element but relying on friction instead of the positive drive pockets or projections of the chain receiving members. By careful design and applying well known principles, and the use of appropriate materials, the forces, components and their coefficient of friction can be made to provide an adequate margin for safe and positive operation without allowing slip.

To increase friction between the flexible cable and the wheels, the regions of the wheels which are in driving engagement with the flexible cable may be coated with a suitable compliant plastic material such as, for example, polyurethane, rubber or other suitable elastomers. Alternatively, one or more layers of bands or belts made from suitable flexible plastic strip material, such as polyurethane or other suitable rubber may be disposed as a liner covering those regions of the pulleys which are in driving engagement with the flexible cable. The advantages of utilizing multiple polyurethane bands which have been stretched and then allowed to conform to the grooves are as follows:

(1) Metals, composites or other rigid materials can be used for the basic precision form of the differential element. An elastomeric friction and wearing surface in the form of bands with uniform thickness can be then stretched over the differential element and made to conform to the grooved surface. The thickness of the band establishes the final working diameters of the two regions of the differential escapement means.

(2) A separate band placed on top of the primary band allows a "soft" failure. If the top layer wears out and tears off, the second layer will provide a new surface.

(3) The friction/wearing surface can be easily changed when required without removing the differential escapement means from the machine.

As shown in FIG. 4 the differential drive comprises three basic elements:

(a) an endless loop of flexible cable 60, (b) a differential escapement means 42 which includes a frame 61, differential member 62 containing two regions with different diameters, a major diameter region 64 and a minor diameter region 68, and means, such as one or more idler pulleys 70 and 72, for maintaining the flexible cable 60 in driving engagement with the differential member 62, and (c) at least two direction turning pulleys 74 and 76.

As illustrated, the frame 61 of the differential escapement means 42 travels on a member 78. A linear bushing 80 may be utilized to guide the motion of the traveling assembly up and down the member 78. Any suitable fixture such as extension 82 can be adapted for connection to a load 84. A base 86 and a top assembly 88 may be utilized for mounting direction turning pulleys 74 and 76 respectively. A tensioning means such as an adjusting means 90 allows slack to be taken up and provides for pretensioning of the loop of flexible cable 60.

The invention may also be provided with a suitable means for applying a force to the flexible cable 60. Such means can be a hand pulling the cable axially or a motor powering any one of the various pulleys included in the drive train. Adding a separate traction device, such as an additional pulley placed anywhere along the circuit, may be beneficial in some applications.

Figure 5:
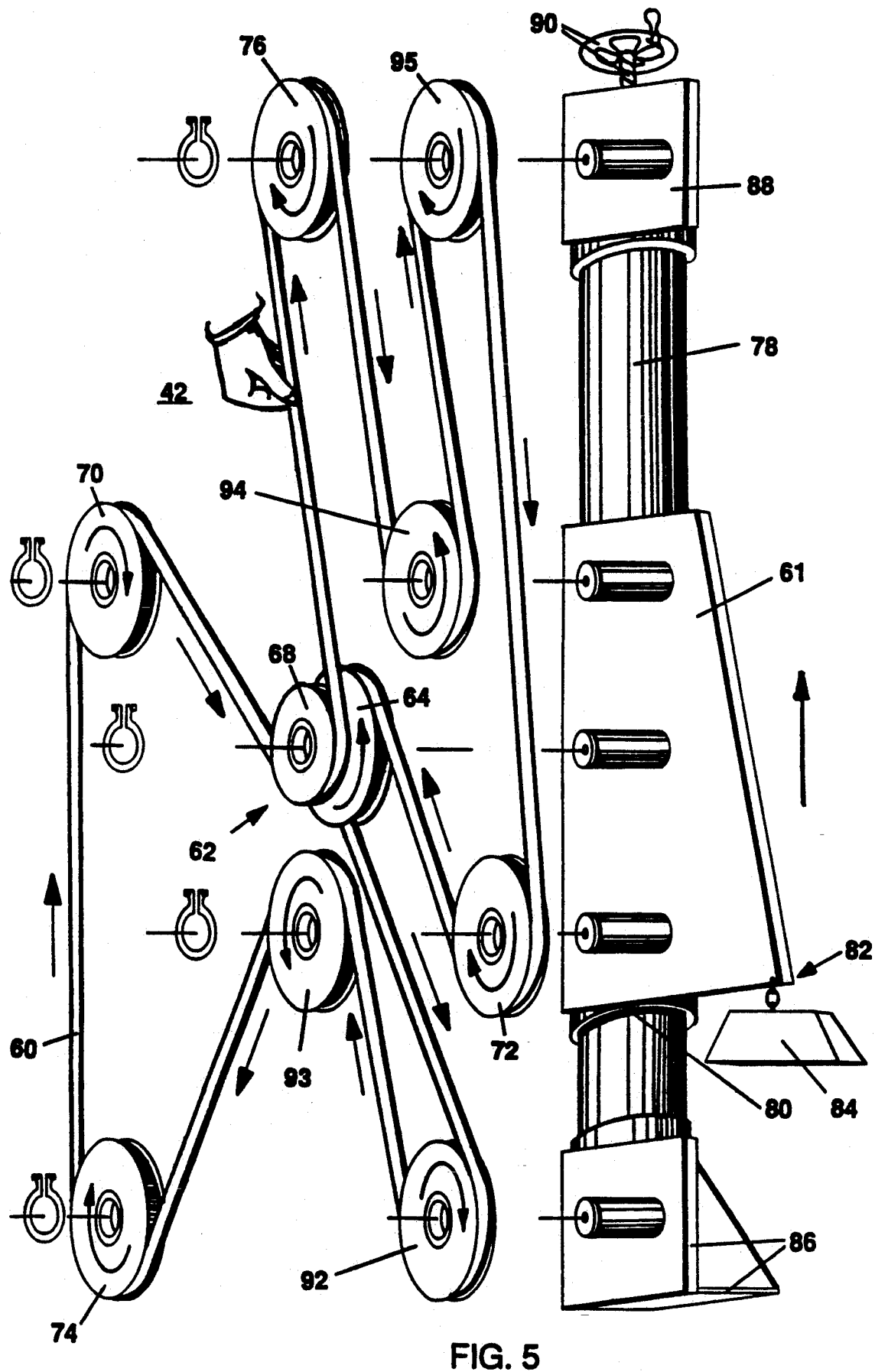
FIG. 5 is a diagrammatic view of a differential drive similar to that illustrated in FIG. 4 but including an additional force multiplying mechanical advantage feature.

FIG. 5 is a diagrammatic exploded view of a differential drive similar to that illustrated in FIG. 4 and including an additional means for multiplying the mechanical advantage. As shown, in addition to all the features described in conjunction with FIG. 4, the arrangement of FIG. 5 includes two additional pairs of additional turning members which are shown as pulleys 92, 93, 94, and 95. These balanced pairs of pulleys increase the lifting capacity of the drive illustrated in FIG. 4 by a factor of two. Any number of pairs can be added as long as the circuits of flexible force transmitting element shown as cable loop 60 on one side of the differential escapement means 42 are balanced by those on the other. Although illustrated as eight separate pulleys, 72 and 93, 74 and 92, 70 and 94, and 76 and 95, four pulleys each having two grooves could also be used if the cable were wrapped appropriately.

Figure 6:
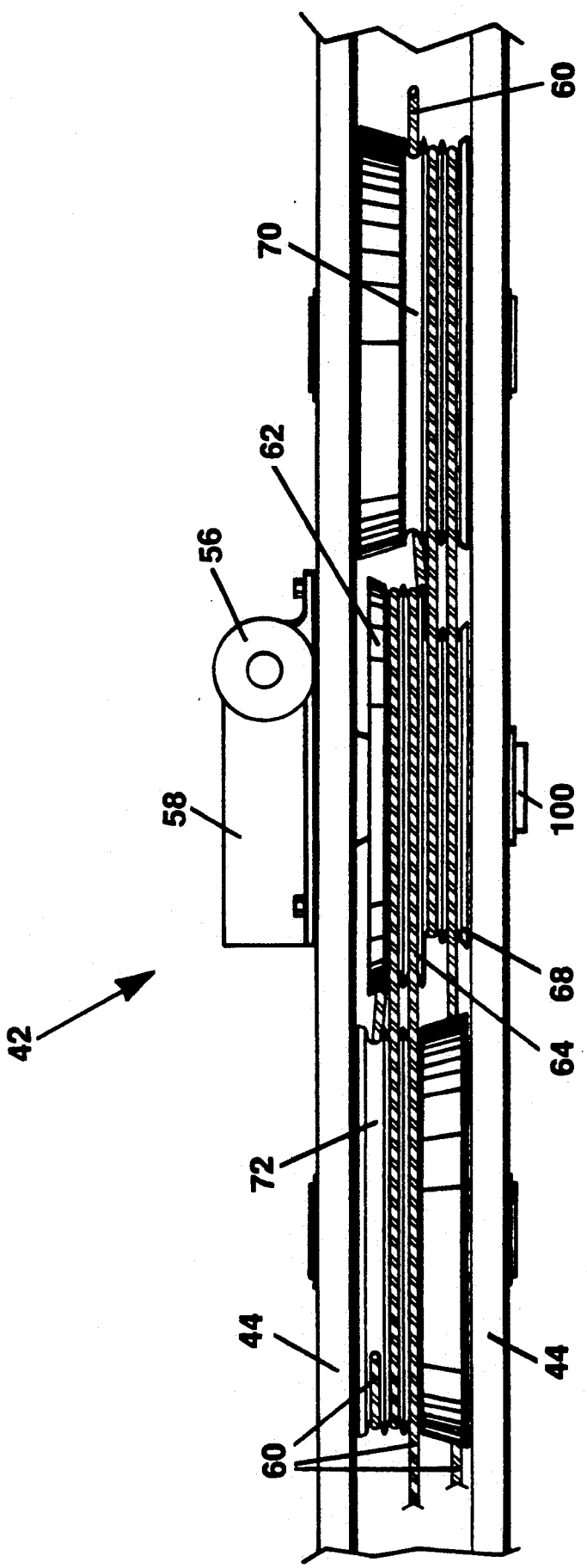
FIG. 6 is a top view showing details of a differential escapement means in accordance with another embodiment of the invention.

FIG. 6 is a top view showing details of a differential escapement means in accordance with another embodiment of the invention wherein the means for maintaining driving engagement between the flexible cable and the differential member includes two idler pulleys. The differential escapement means 42 includes a frame 44 carrying a motor 56 coupled to and driving a gear reduction unit 58, preferably a worm gear type gear reduction unit if the ratio is not inherently self locking. This feature is a function of the overall drive ratio and the integrated friction of all elements in contact with the endless loop. A differential member 62 is mounted for rotation within frame 44 and is fixed to a shaft 100 of gear reduction unit 58. Differential member 62 has a major diameter region 64, and a minor diameter region 68.

The differential escapement means 42 also includes means for maintaining driving engagement of the flexible cable 60 with the differential member 62. To this end, a first idler pulley 70 is mounted for rotation within frame 44 on one side of the differential member 62 and a second idler pulley 72 is rotatably mounted for rotation within frame 44 and on the opposite side of differential member 62. Although in FIG. 4 there are shown two idler pulleys, 70 and 72, one on either side of the differential member 62 and suitably rotatably mounted within the frame 44, for some applications only one such idler pulley will be required.

In the arrangement illustrated in FIG. 6 multiple passes of cable over the same diameter groove are made possible by the differential escapement means 42 which includes the differential member 62 and idler pulleys 70 and 72 on either side of the differential member 62, with loops from the major diameter grooves 64 going around the idler pulley 72 on one side and loops from the minor diameter grooves 68 going around the idler pulley 70. This arrangement minimizes the radial loads on the differential member 62. While the use of one or more idler pulleys for this purpose is convenient and effective, any other suitable means which will maintain the flexible force transmitting element in driving engagement with the differential member may be employed.

In FIG. 6 both the major diameter region 64 and the minor diameter region 68 of differential member 62 and the idler pulleys 70 and 72 are shown as having multiple grooves, however, for many applications pulleys each having only one or two grooves will be entirely satisfactory. Also, although a gear reduction unit 58 is illustrated, it should be understood that for applications with inherent high ratios no such gear reduction unit will be required and the differential member 62 can be fixed directly to the shaft of the motor. The endless loop of flexible cable 60 is arranged to drivingly interconnect the differential member 62 and the idler pulleys 70 and 72, with two direction turning pulleys 74 and 76 which make up the remainder of the differential drive. One embodiment of this arrangement is illustrated in FIG. 8A.

Figure 7:
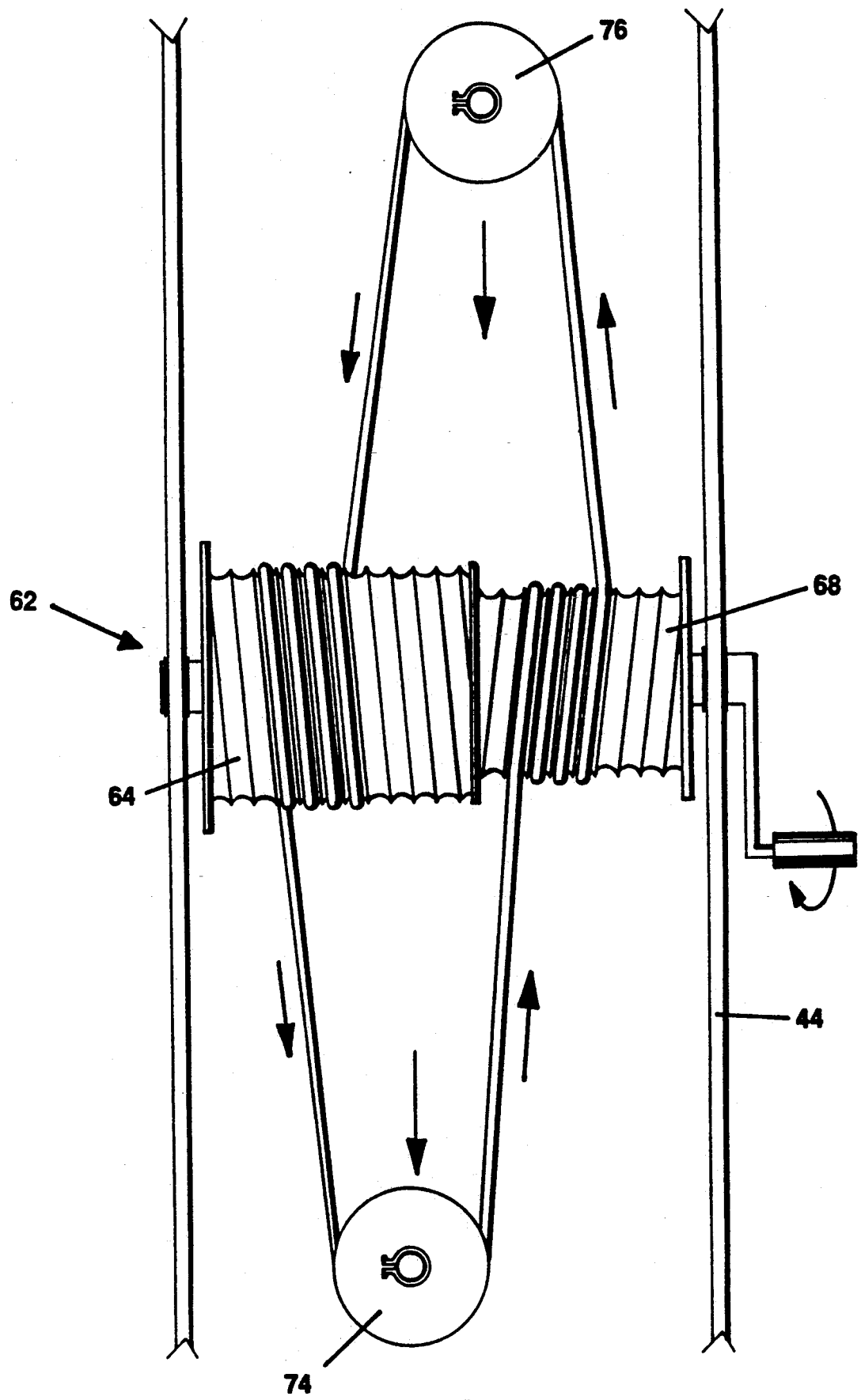
FIG. 7 is a diagrammatic view of the differential escapement means in accordance with yet another embodiment of the invention wherein the differential member includes a spiral arrangement of grooves with a flexible cable in driving engagement therewith.

In FIG. 7 there is shown an alternative arrangement for maintaining the flexible force transmitting element in driving engagement with the differential member. For example, for some applications, instead of employing one or more idler pulleys to provide the means for maintaining the flexible force transmitting element in driving engagement with the differential member 62, such means may be provided by a spiral arrangement of cable receiving grooves on the regions 64 and 68 of the differential member 62.

Pretension developed in the cable 60 is identical along the entire length of the cable loop when the system is not loaded. In cases which have a simple loop of cable with a mechanical advantage multiplier of two, when a load up to twice the pretension value is applied, the tension in the portion of the loop in the direction from which the load is applied does not change appreciably. Loads reduce tension from the pretension value in the other portion of the loop. Loads larger than twice the pretension value do increase the tension on the loaded side. When external loads are applied the reduction in tension on the "lee" side divides equally between (or among) the cables on that side. Torque results from external loads; in the case of a simple loop, equal forces, one half the original, act on the two different radii, that of the major diameter region and that of the minor diameter region.

An actual example will be used to illustrate the power and simplicity of this invention. A drive is required for an equatorially mounted point focus solar collector with a reflector area of 600 square meters within a frame which covers 700 square meters. In the design process, the loads imposed by winds while operating at a variety of attitudes and while stowed are evaluated for the specific wind category of the installation. The maximum unbalanced moment which may result from ice buildup, removing the receiver or other maintenance operation is also established. An appropriate cable diameter with a proper factor of safety is chosen. For a specific cable construction, the manufacturer recommends a minimum pulley diameter which establishes the minor diameter of the differential pulley as well as recommended minimums for other pulleys. Following is a list of the characteristics of the drive for the solar collector used for this example:

| Cable Diameter: | 9.53 mm | 7 × 19 Galvanized Type |
| Cable Rating: | 1,764 kgs | (6,545 kgs, ultimate) |
| Minor Pulley Diameter: | 485.8 mm | (51 Cable Diameters) |
| Collector Slew Speed: | 864 mm/min. | @ O.D.: 12 Rev./Day |
| R.A. Drive Diameter | 32.9 meters | |
| R.A. Drive Rating: | 58,000 kg - meters | |
| Motor: | 0.5 kilowatt (typically drawing <100 watts) | |
| Power Consumption: | 0.3 kilowatthours/day | |

The following table shows the values of different design options for specifying the drive for this solar collector:

| DRIVE RATIO DIF. MEM.: STRUCTURE | PULLEY SPEED @ SLEW RPM | INPUT TORQUE METER - KGS | MAJOR DIA. MM |
|---|---|---|---|
| 2,400 :1 | 20 | 36.0 | 513.3 |
| 4,800 :1 | 40 | 18.0 | 499.5 |
| 9,600 :1 | 80 | 9.0 | 492.7 |
| 19,200 :1 | 160 | 4.5 | 489.2 |
| 38,400 :1 | 320 | 2.2 | 487.5 |
| 76,800 :1 | 640 | 1.1 | 486.6 |
| 153,600 :1 | 1,280 | 0.6 | 486.2 |
| 307,200 :1 | 2,560 | 0.3 | 486.0 |

One can see from the above that by simply changing the major diameter of the differential member the designer can balance competing characteristics to optimize life, reliability, simplicity and cost. Increasing the ratio of the drive, increases the speed of the cable and greatly reduces the force needed to move the cable which reduces the complexity and cost of the motor and traction components. At the same time, the number of cycles that the cable loop must make each day is increased. The input torques listed deliver the rated load of 58,000 kilogram-meters and are also equal to the torque required to lock such a load. In the higher drive ratios the total friction, static and dynamic, of the components including the motor which have to move can be enough to lock the drive and prevent wind or gravity from "weathervaning" the structure.

Figure 8:
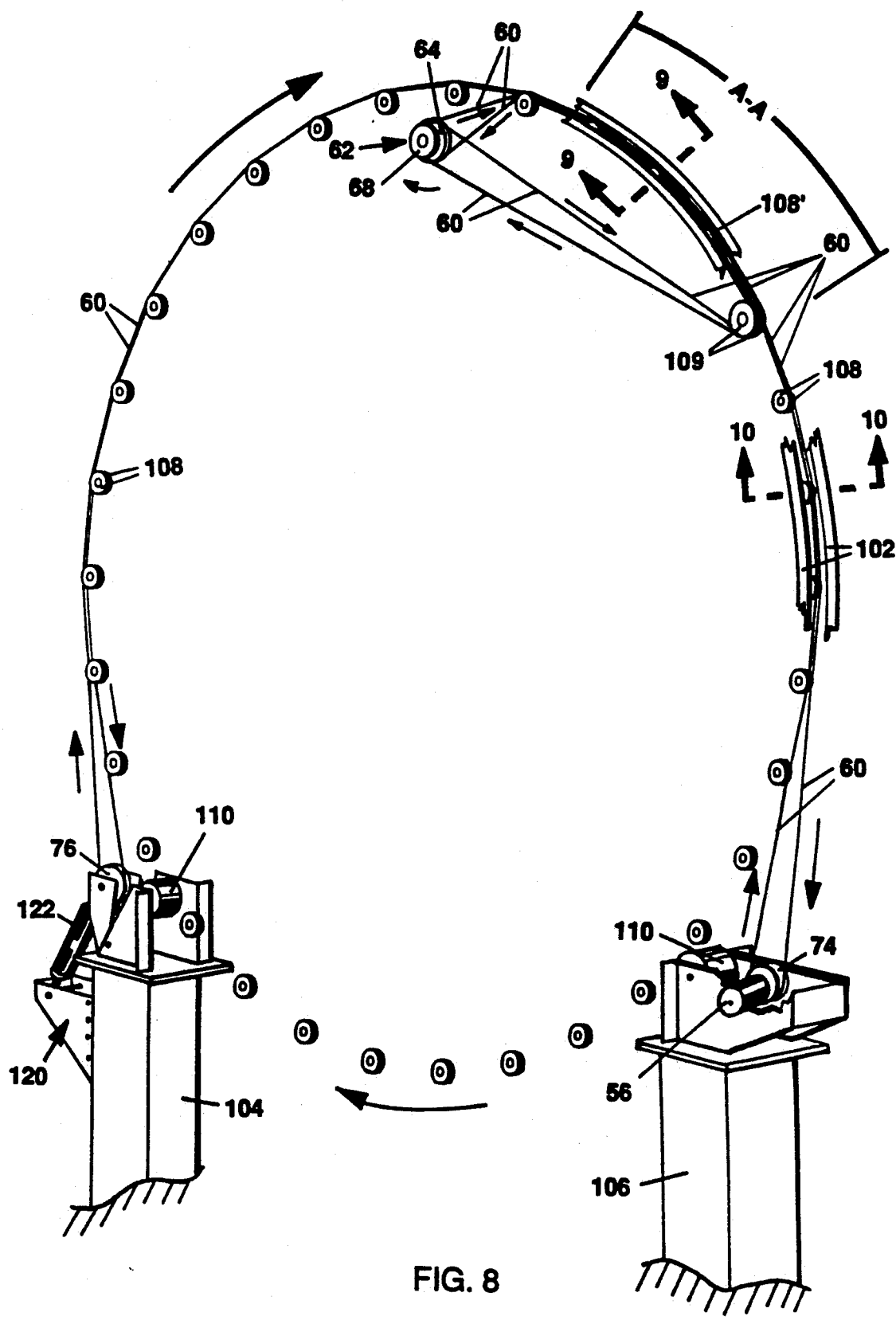
FIG. 8 is a diagrammatic view of the differential drive in accordance with this invention showing one arrangement and the routing of the flexible cable for applying force to rotate a structure of the type having a curved rim rotatably supported from the ground.
Figure 8A:
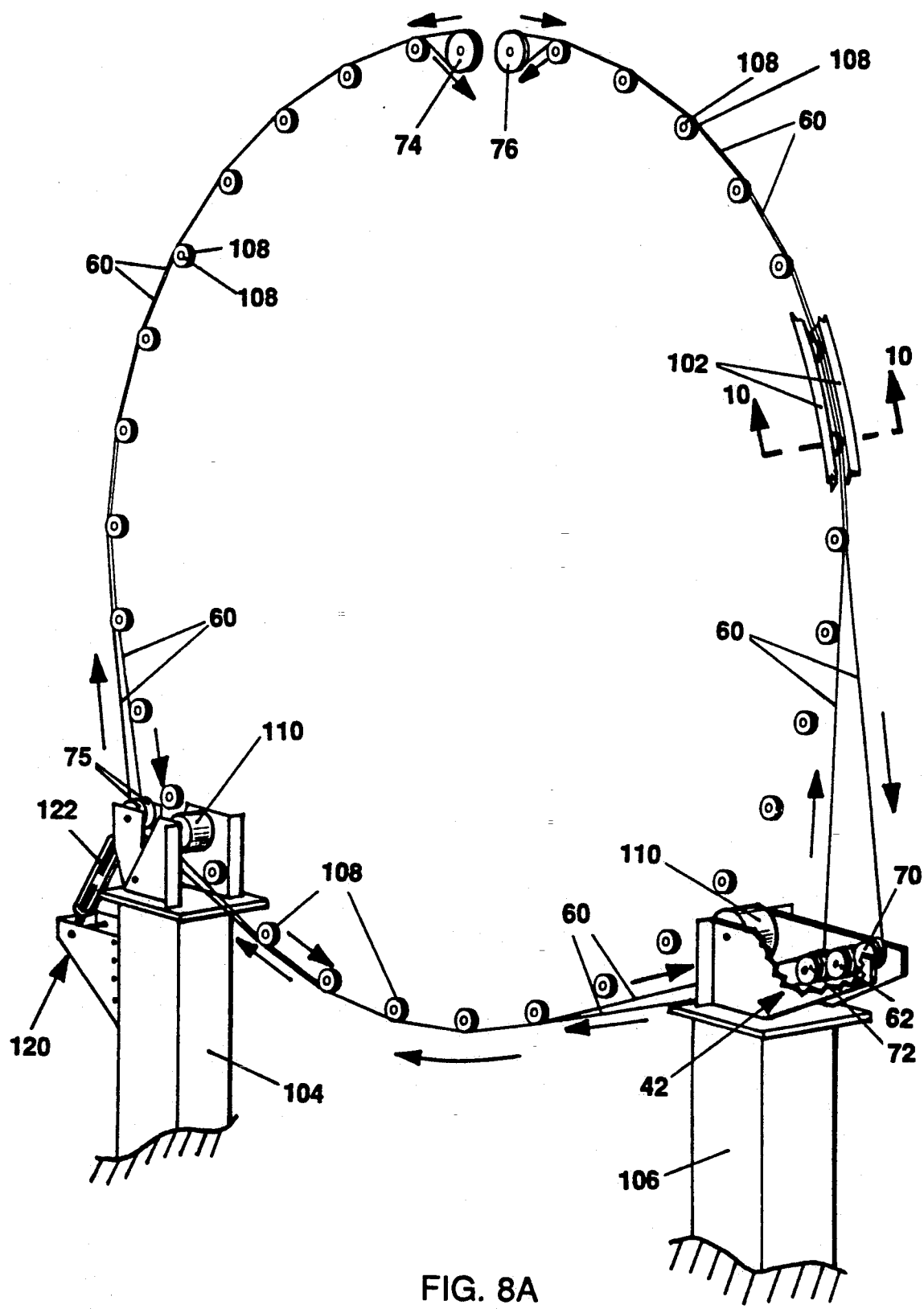
FIG. 8A is a diagrammatic view of a differential drive similar to that shown in FIG. 8 but having the direction turning pulleys attached to the structure which moves and the differential escapement fixed to the foundation.

FIG. 8 is a diagrammatic view of the differential drive in accordance with this invention showing one arrangement and the routing of the flexible cable for applying force to rotate a structure of the type having an arcuate member, shown as a curved rim 102 rotatably supported from the ground. As illustrated in FIG. 8 the curved rim 102 is supported for rotation by ground supports shown at 104 and 106.

Curved rim 102 is provided with a plurality of simple cable guide wheels 108 which are rotatably connected to the rim 102 in circumferentially spaced-apart relationship. So there will be no interference with the rolling engagement of the rim 102 and the rollers 110 which rollingly support the rim 102 from the ground supports 104 and 106, the cable guide wheels 108 extend to near but not radially beuond the periphery of the rim 102

Figure 9:
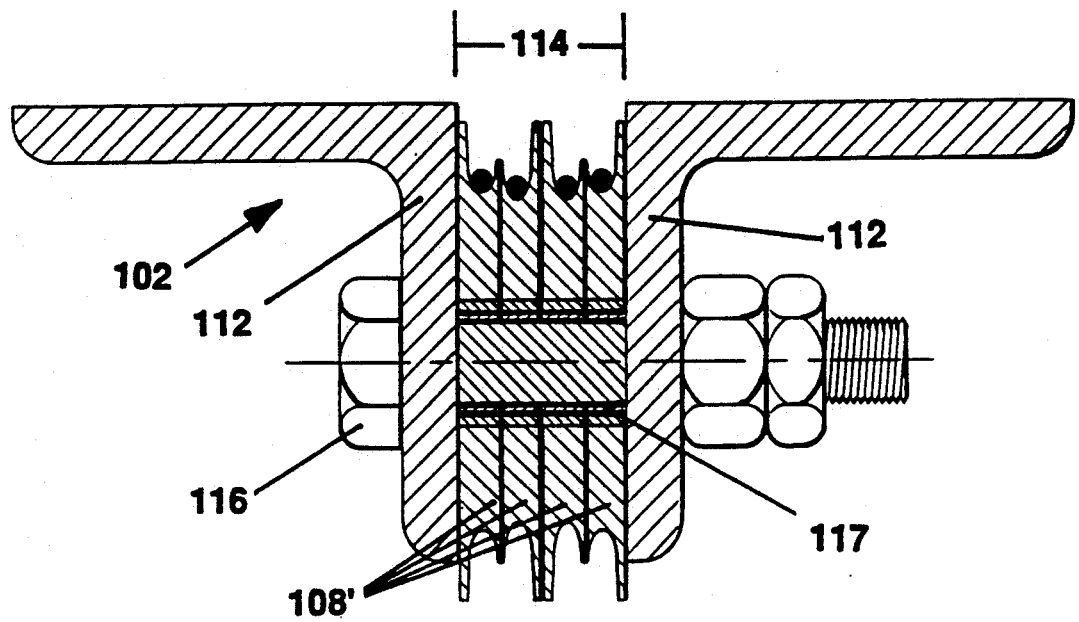
FIG. 9 is a sectional view taken along the line 9—9 of FIG. 8 and showing the mounting of the cable guide wheels in the overlapping section of the rim.
Figure 12:
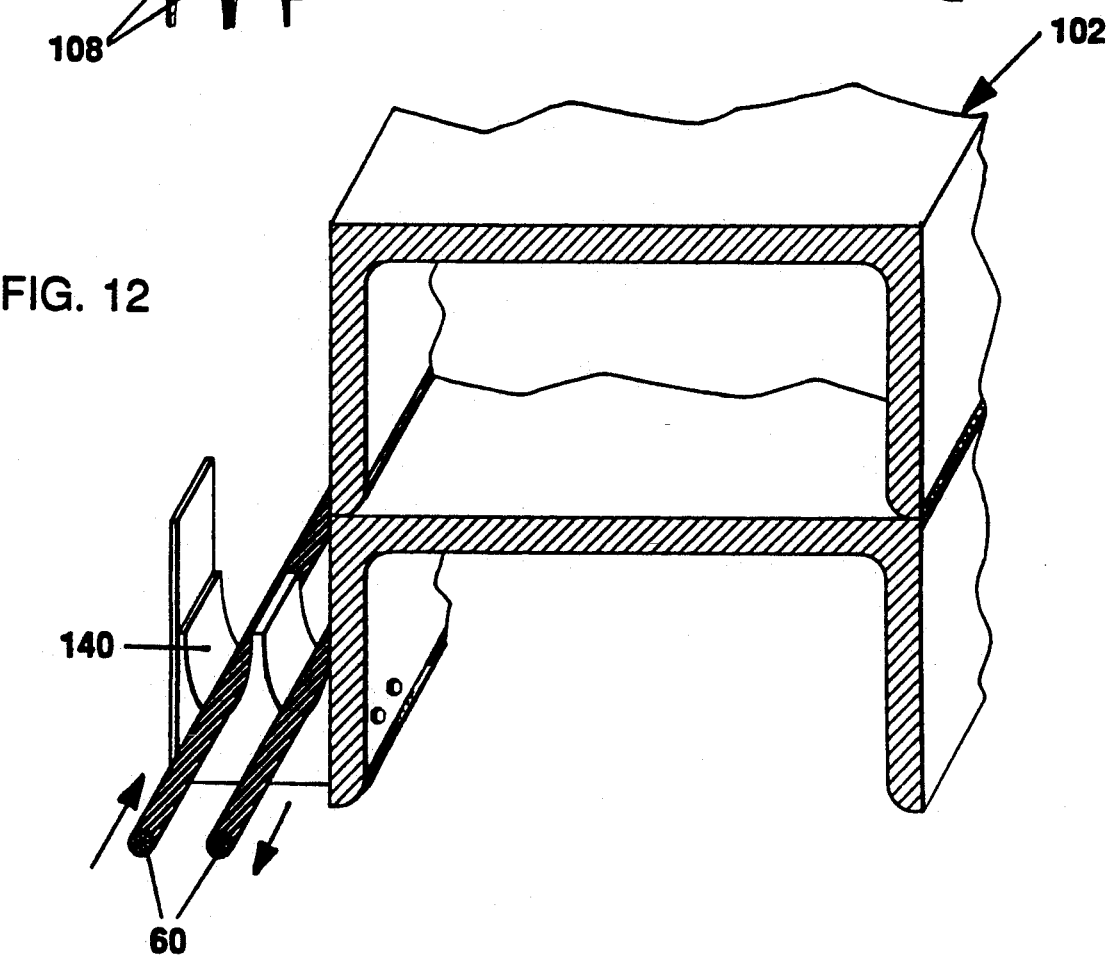
FIG. 12 is a similar perspective view of a portion of a rim illustrating an alternate cable guide.

(FIG. 9). For some applications a suitable cable guide can be provided by a plastic block 140 or other suitable material which will allow for smooth relative motion of the flexible cable 60 as illustrated in FIG. 12.

As shown in the arrangement illustrated in FIG. 8, overlapping the flexible cable 60 in the region A—A allows the structure to be rotated more than 180 degrees. Accordingly, as shown in FIG. 9, four cable guide wheels 108' in the region A—A accommodate this overlap. FIG. 8 also shows the first direction turning pulley 74 connected with the rim ground support 106 and the second direction turning pulley 76 connected with the rim ground support 104. A suitable motor 56 is coupled with and drives first direction turning pulley 74. Simple cable guide wheels 108 (FIG. 10) are connected to the regions of the rim 102 other than the region A—A. Guide wheels 109 are illustrated as having larger diameters than pulley guide wheels 108 and 108' since in this arrangement such pulleys are subjected to larger forces. In other arrangements they could be the same size as guide wheels 108 and 108' mounted to rim 102.

The endless loop of flexible cable 60 passes around the rim 102 and over the guide wheels 108, 108' and 109 and drivingly interconnects the differential member 62, the guide wheels 108, 108' and 109 and the first and second direction turning pulleys 74 and 76. The size of the flexible cable 60 and the number of cable receiving grooves in the regions 64 and 68 of differential member 62 and guide wheels 108, 108' and 109 are determined by the forces required for driving and holding the rim 102 and the structure associated with it and its loads, and the coefficient of friction between the flexible drive cable 60 and the differential member 62.

Figure 10:
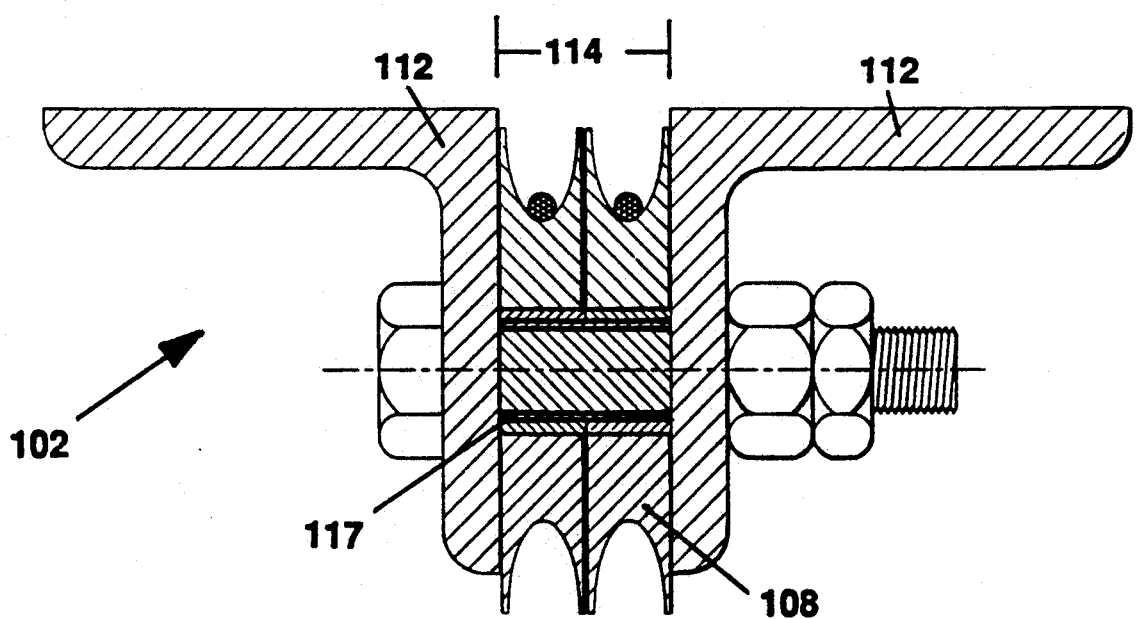
FIG. 10 is a sectional view taken along the line 10—10 of FIG. 8 and showing the mounting of simple cable guide wheels in the rim.
Figure 11:
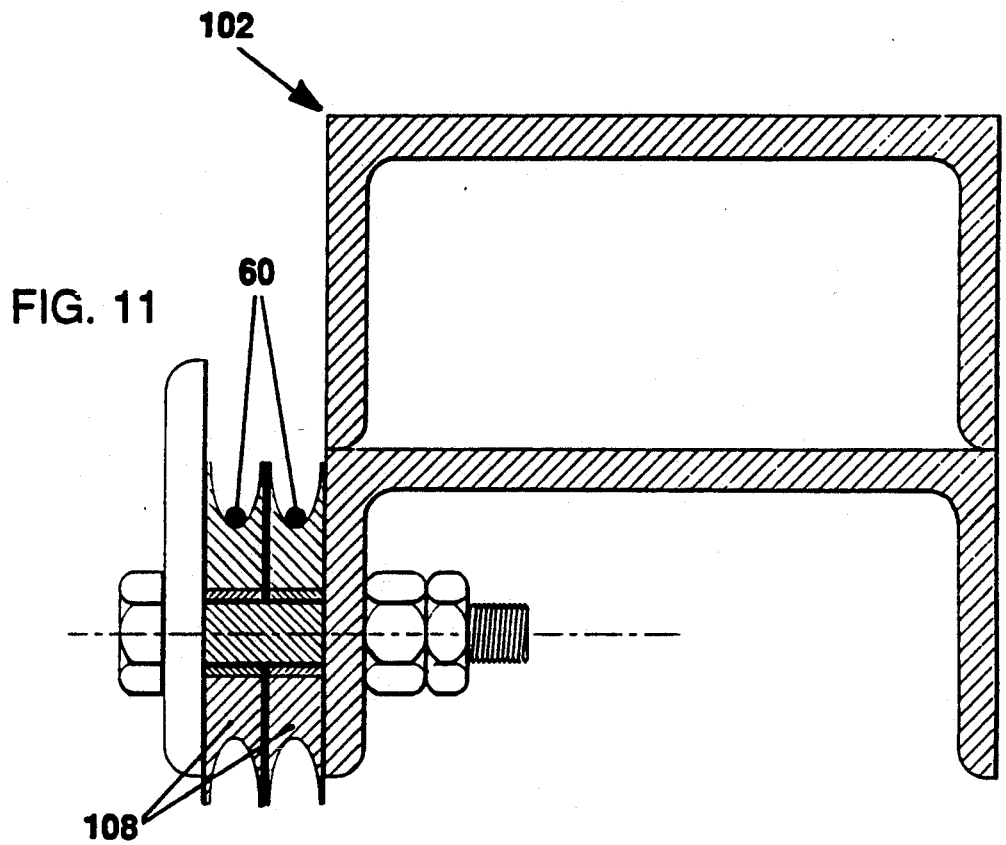
FIG. 11 is a perspective view illustrating a portion of a rim with cable guide wheels mounted to the side of a rim composed of a single member.

Conveniently, as shown in FIGS. 9 and 10 the rim 102 may be constructed from two suitably shaped sections, which may be angle sections 112, arranged in spaced apart, side by side relationship to provide for a small space 114 between such sections. The guide wheels 108, each having one or more grooves, are suitably rotatably mounted on a shaft shown as provided by the bolt 116 and spacer 117 within this space and extend to just inside the periphery of the rim 102 so as to provide for rolling and guiding contact for the flexible drive cable 60 and without interference with the rollers 110 at the rim support piers 104 and 106.

In addition to providing a rigid drive for the rim 102 and any structure associated with it, the flexible cable 60 can be sized to hold the rim 102 to the rollers 110 mounted on the rim support piers 104 and 106 under any wind conditions. Locating the turning pulleys 74 and 76 on the rim supports 106 and 104 outside the rollers 110 as shown allows the cable 60, for wind events coming from the same side, to hold the rim 102 to the rollers 110 without interfering with them. The direction turning pulleys 74 and 76 and the flexible cable 60 can also be made to function to hold the rim 102 securely to the rollers 110 thereby obviating the need for separate hold-down cables or other hold-down means. A suitable means 120 for taking out play and pretensioning the loop of cable 60 may be conveniently integrated with turning pulley 76. Conveniently, this can be provided by a turnbuckle 122 as illustrated, or any other suitable tension adjusting means.

In operation, for each revolution the differential member 62 is rotated clockwise, since the length of cable advanced off the major diameter region 64 is slightly more than that wound on the minor diameter region 68, the rim 102 travels clockwise one-half the difference between the circumferences of the major and minor diameter regions 64 and 68 of differential member 62.

Driving the large diameter rim 102 provides a large mechanical advantage which minimizes the speed reduction and torque rating of the drive, minimizes the strength required in other components, and allows very precise tracking with minimal lost motion. The use of a motor with a worm gear speed reduction unit prevents motion except when driven by the motor and eliminates the need for a brake or other locking device. The use of flexible cable as the driving means in the foregoing differential drive arrangement allows a very strong inexpensive machine element with outstanding reliability in exposed use outdoors, not only to fix the curved rim and its associated structure so that the system points in the desired direction, but also to anchor it directly to widely spaced foundations.

For many applications the difference between the major diameter and the minor diameter regions 64 and 68 of differential member 62 may be small as shown in the table listed earlier. For example, in one such system if differential member 62 is turned at 320 RPM and the major diameter region 64 was 487.5 millimeters, the minor diameter region 68 would have to be about 1.7 millimeters smaller. The resultant motion of the curved rim 102 with a diameter of 32.9 meters would be about one revolution per two hours, or twelve times the apparent speed of the sun.

FIG. 8A is a diagrammatic sectional view similar to that of FIG. 8 wherein the turning pulleys 74 and 76 are connected with the rim 102 and the differential escapement means 42 is made the fixed member anchored to the ground support 106. Whereas in the arrangement shown in FIG. 8 the routing of the loop of cable 60 included an overlapping region A-A which increased the degree of travel of the moving structure, no such overlapping region is provided in the arrangement shown in FIG. 8A.

The foregoing differential drive provides for: a large speed reduction between the drive and the load; enables an integrated drive system with redundant elements; allows for simple, safe, and very controlled operation; does not require large accurately machined elements except for relatively small pulleys easily turned in a lathe, molded or cast; and provides for locking the load without the need for a brake or separate locking device.

Although only certain specific embodiments of the invention have been described in detail herein with reference to the accompanying drawings, it is to be understood that the invention is not limited to those specific embodiments and that various changes and modifications will occur to those skilled in the art. The appended claims, therefore, are intended to cover all such changes and modifications as fall within the true spirit and scope of the invention.

We claim:

1. A differential drive, comprising:
   an endless loop of flexible force transmitting element;
   first and second direction turning members adapted for receiving said flexible force transmitting element in driving engagement therewith;
   a differential escapement means disposed mechanically between said first and second direction turning members and adapted for receiving said flexible force transmitting element in driving engagement therewith, one of (a) said differential escapement means and (b) said first and second direction turning members being arranged to be a movable member adapted for connection to a load and the other arranged to be a fixed member adapted for connection with a support; said endless loop of flexible force transmitting element drivingly interconnecting said first and second direction turning members and said differential escapement means;

said differential escapement means including a frame and means mounted in said frame for causing the unit length of flexible force transmitting element moving in one direction with respect to said frame to be different by a controlled amount from that moving in the opposite direction with respect to said frame, whereby adequate force applied to said flexible force transmitting element produces a ratioed amount of relative motion between said direction turning members and said differential escapement means and has a mechanical advantage equal to the ratio between the motion of said flexible force transmitting element and the motion between said direction turning members and said differential escapement means.

2. The differential drive recited in claim 1 wherein said first and second direction turning members are arranged to be the fixed member and said differential escapement means is arranged to be the movable member.

3. The differential drive recited in claim 2 further including means for pretensioning said flexible force transmitting element.

4. The differential drive recited in claim 1 wherein said means mounted in said frame for causing the unit length of flexible force transmitting element moving in one direction with respect to said frame to be different by a controlled amount from that moving in the opposite direction includes a differential member having adjacent regions of different diameters, and means for maintaining said force transmitting element in contact with said differential member.

5. The differential drive recited in claim 4 wherein said first and second direction turning members are arranged to be the fixed member and said differential escapement means is arranged to be the movable member.

6. The differential drive recited in claim 4 wherein said first and second direction turning members are arranged to be the movable member and said differential escapement means is arranged to be the fixed member.

7. The differential drive recited in claim 1 wherein said means mounted in said frame for causing the unit length of flexible force transmitting element moving in one direction with respect to said frame to be different by a controlled amount from that moving in the opposite direction includes a pair of meshing gears each having a different number of gear teeth, and means carried by each of said gears adapted for receiving said force transmitting element.

8. The differential drive recited in claim 7 wherein said first and second direction turning members are arranged to be the fixed member and said differential escapement means is arranged to be the movable member.

9. The differential drive recited in claim 7 wherein said first and second direction turning members are arranged to be the movable member and said differential escapement means is arranged to be the fixed member.

10. The differential drive recited in claim 1 further including means for pretensioning said flexible force transmitting element.

11. The differential drive recited in claim 1 wherein said means mounted in said frame for causing the unit length of flexible force transmitting element moving in one direction with respect to said frame to be different by a controlled amount from that moving in the opposite direction includes first and second means adapted for receiving said flexible force transmitting element and first and second motive means arranged and constructed for differentially driving said first and second means adapted for receiving said flexible force transmitting element.

12. The differential drive recited in claim 1 wherein said first and second direction turning members are arranged to be the movable member and said differential escapement means is arranged to be the fixed member.

13. The differential drive recited in claim 12 further including means for pretensioning said flexible force transmitting element.

14. The differential drive recited in claim 1 wherein said load comprises a structure supported for rotation with respect to the ground and said differential drive is arranged to cause rotation of said structure.

15. The differential drive recited in claim 14 wherein said first and second direction turning members are arranged to be the fixed member and are anchored separate from said structure, and said differential escapement means is arranged to be the movable member and is connected with said structure.

16. The differential drive recited in claim 15 wherein said structure includes an arcuate member.

17. The differential drive recited in claim 14 wherein said first and second direction turning members are arranged to be the movable member and are connected with said structure and said differential escapement means is arranged to be the fixed member and anchored separate from said structure.

18. The differential drive recited in claim 17 wherein said structure includes an arcuate member.

19. The differential drive recited in claim 14 wherein said structure includes an arcuate member.

20. A differential drive, comprising:
an endless loop of flexible force transmitting element;
first and second direction turning members adapted for receiving said flexible force transmitting element in driving engagement therewith;
means for pretensioning said loop of flexible force transmitting element; and
a differential escapement means disposed mechanically between said first and second direction turning members,
one of (a) said differential escapement means and (b) said first and second direction turning members being arranged to be a movable member adapted for connection to a load and the other arranged to be a fixed member and adapted for connection with a support,
a differential escapement means including:
a frame,
a differential member mounted for rotation within said frame and including first and second regions each having a different diameter, each of said first and second regions adapted for receiving said flexible force transmitting element in driving engagement therewith, and means for maintaining driving engagement of said flexible force transmitting element with said differential member;

said endless loop of flexible force transmitting element drivingly interconnecting said first and second direction turning members and said differential member whereby adequate force applied to said flexible force transmitting element produces a controlled amount of relative motion between said direction turning members and said differential escapement means and has a mechanical advantage equal to the ratio between the motion of said flexible force transmitting element and the motion between said direction turning members and said differential escapement means.

21. The differential drive recited in claim 20 wherein said differential escapement means is arranged to be the fixed member adapted for connection to a support and said first and second direction turning members are arranged to be the movable member adapted for connection to a load.

22. The differential drive recited in claim 20 wherein said first and second direction turning members are arranged to be the fixed member adapted for connection to a support and said differential escapement means is arranged to be the movable member adapted for connection to a load.

23. The differential drive recited in claim 20 further including motive means for causing rotation of a selected one of said members which are drivingly interconnected by said endless loop of flexible force transmitting element thereby applying a force to said flexible force transmitting element.

24. The differential drive recited in claim 20 wherein said means for maintaining driving engagement of said flexible force transmitting element with said differential member includes at least one idler member disposed mechanically between said differential member and one of said direction turning members, said idler member adapted for receiving said flexible force transmitting element in driving engagement therewith.

25. The differential drive recited in claim 20 wherein said means for maintaining driving engagement of said flexible force transmitting element with said differential member includes a plurality of spirally disposed grooves on each of the first and second different diameter regions of said differential member.

* * * * *